US008637176B2

(12) United States Patent
Wurth

(10) Patent No.: US 8,637,176 B2
(45) Date of Patent: Jan. 28, 2014

(54) STARTER BATTERY AND CASE

(76) Inventor: James Wurth, Las Vegas, NV (US)

(*) Notice: Subject to any disclaimer, the term of this patent is extended or adjusted under 35 U.S.C. 154(b) by 1504 days.

(21) Appl. No.: 11/842,895

(22) Filed: Aug. 21, 2007

(65) Prior Publication Data

US 2008/0050647 A1    Feb. 28, 2008

Related U.S. Application Data

(60) Provisional application No. 60/839,192, filed on Aug. 22, 2006.

(51) Int. Cl.
*H02J 7/14* (2006.01)
*H01M 2/26* (2006.01)
*H01M 2/28* (2006.01)

(52) U.S. Cl.
USPC ........... 429/121; 429/122; 320/103; 320/104; 320/105

(58) Field of Classification Search
None
See application file for complete search history.

(56) References Cited

U.S. PATENT DOCUMENTS

| 4,863,812 | A | * | 9/1989 | Ueda et al. ................. 429/9 |
| 6,215,273 | B1 | * | 4/2001 | Shy ............................ 320/105 |
| 6,636,015 | B1 | * | 10/2003 | Levine et al. ............... 320/105 |
| 6,799,993 | B2 | * | 10/2004 | Krieger et al. .............. 439/500 |
| 2002/0041174 | A1 | * | 4/2002 | Purkey ........................ 320/103 |

* cited by examiner

*Primary Examiner* — Barbara Gilliam
*Assistant Examiner* — Steven Scully
(74) *Attorney, Agent, or Firm* — Parsons & Goltry; Robert A. Parsons; Michael W. Goltry

(57) ABSTRACT

A starter battery and case assembly includes a rechargeable battery contained within a battery box and a lid constructed to releasably engage the battery box. An electrical connector is electrically attached to the battery. The battery and battery box define an upper surface with upwardly extending upper edges and the lid is constructed to extend over and downwardly around the upper edges of the battery box and to enclose the upper surface and the upper edges. The lid includes a handle for conveying the assembly. A mating electrical connector carried by the lid is positioned to engage the electrical connector of the battery with the lid engaged. Two opposite polarity cables are connected to the battery through the mating electrical connector and adapted to be connected to a remote electrical system. A recharge cord is attached to the battery and adapted to be attached to a source of power.

21 Claims, 3 Drawing Sheets

STARTER BATTERY AND CASE

CROSS-REFERENCE TO RELATED APPLICATION

This application claims the benefit of U.S. Provisional Application No. 60/839,192, filed 22 Aug. 2006.

FIELD OF THE INVENTION

This invention generally relates to a battery carrier for starting engines and the like.

BACKGROUND OF THE INVENTION

In many instances, batteries are used in motor staring operations, such as for starting engines in small aircraft and the like. Generally, the battery is used to boost the operating internal battery in the aircraft and to reduce stress on the internal battery.

To perform the starting operation, the booster battery must be carried to the aircraft and connected into the electrical system. Once the aircraft is started the booster battery must be carried back to a storage area and, generally, periodically recharged. After a number of uses, the battery does not recharge properly and the entire assembly is discarded and a new assembly is brought on line.

In many instances, separate cables are used to connect the battery to the aircraft and different cables are used to connect the battery to an electrical recharging source.

Also, the battery can become dirty and hard to handle without encountering chemicals and the like associated with the battery.

It would be highly advantageous, therefore, to remedy the foregoing and other deficiencies inherent in the prior art.

Accordingly, it is an object of the present invention to provide a new and improved starter battery and case assembly.

Another object of the invention is to provide a new and improved starter battery and case assembly that is convenient, easy to use, and to store.

Another object of the invention is to provide a new and improved starter battery and case assembly that is more efficient and does not have to be completely disposed of when a new battery is required.

SUMMARY OF THE INVENTION

Briefly, to achieve the desired objects of the instant invention in accordance with a preferred embodiment thereof, provided is a starter battery and case assembly including a battery contained within a battery wrap with an electrical connector electrically attached to the battery and a lid constructed to releasably engage the battery wrap and to cover and protect the battery. The lid includes a handle for conveying the assembly and a mating electrical connector carried by the lid. The mating electrical connector is positioned to electrically engage the electrical connector electrically attached to the battery with the lid engaged with the battery wrap. Two opposite polarity cables each have one end connected to the battery through the mating electrical connector and a second end adapted to be connected to a remote electrical system.

A major advantage of the assembly, in addition to its convenience and versatility, is that in the preferred embodiment the lid is constructed to releasably engage any one of a plurality of batteries. Each individual battery of the plurality of batteries is substantially similar, i.e. each battery is contained within a battery wrap and includes an electrical connector electrically attached to the individual battery.

The desired objects of the instant invention are further achieved in accordance with a more specific embodiment in which a starter battery and case assembly include a rechargeable battery contained within a battery box and a lid constructed to releasably engage the battery box. An electrical connector is electrically attached to the battery. The battery and battery box define an upper surface with upwardly extending upper edges and the lid is constructed to extend over and downwardly around the upper edges of the battery box and to enclose the upper surface and the upper edges. The lid includes a handle for conveying the assembly and a mating electrical connector carried by the lid. The mating electrical connector is positioned to electrically engage the electrical connector electrically attached to the battery with the lid engaged with the battery box. Two opposite polarity elongated cables each have one end connected to the battery through the mating electrical connector and a second end adapted to be connected to a remote electrical system. A recharge cord has one end electrically attached to the battery and a second end adapted to be electrically attached to a source of power.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF A PREFERRED EMBODIMENT

Figure 1:
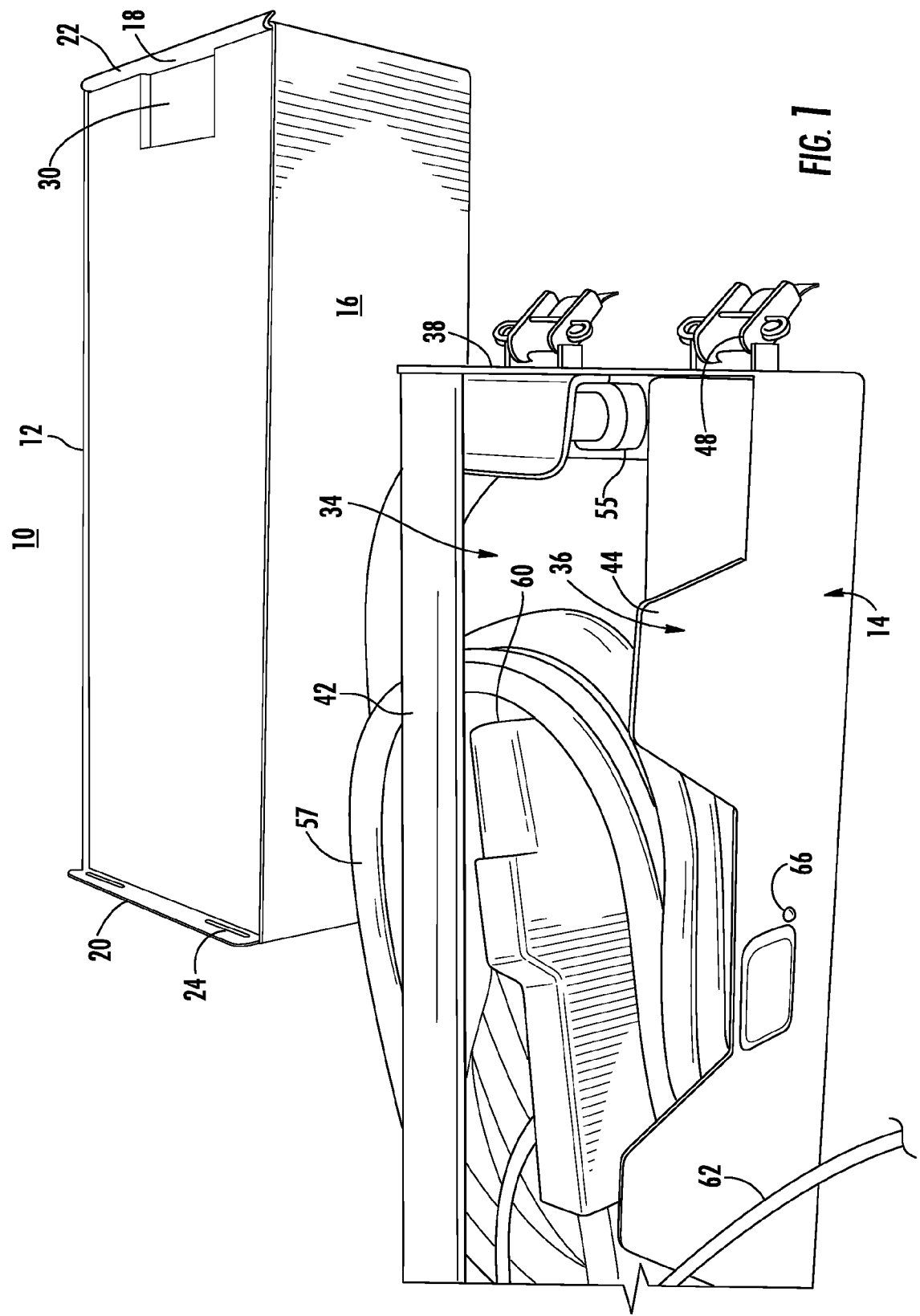
FIG. 1 is a view in perspective of a starter battery and case assembly partially disassembled, in accordance with the present invention.
Figure 2:
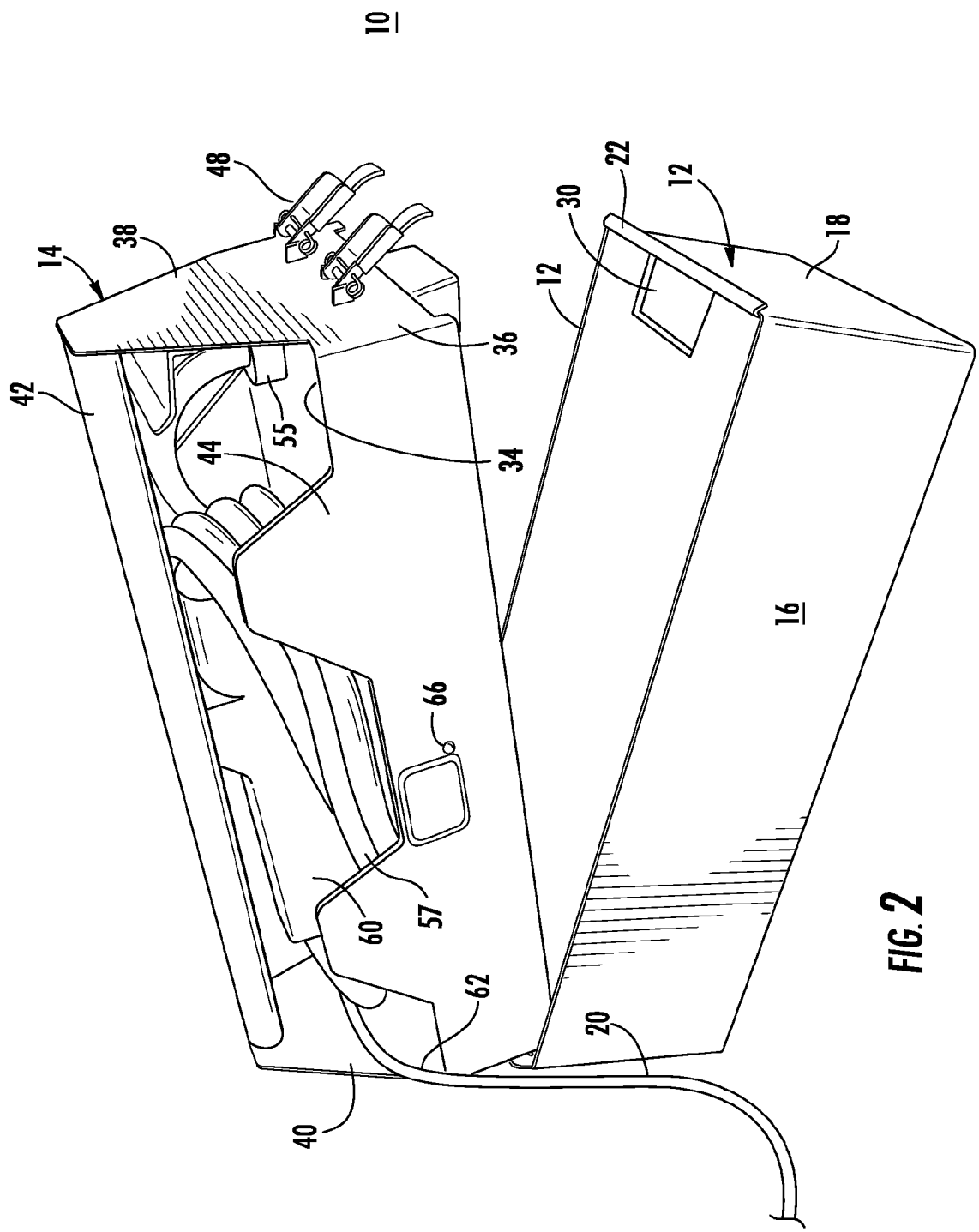
FIG. 2 is view in perspective of the starter battery and case assembly of FIG. 1 in a processes of being assembled for use.
Figure 3:
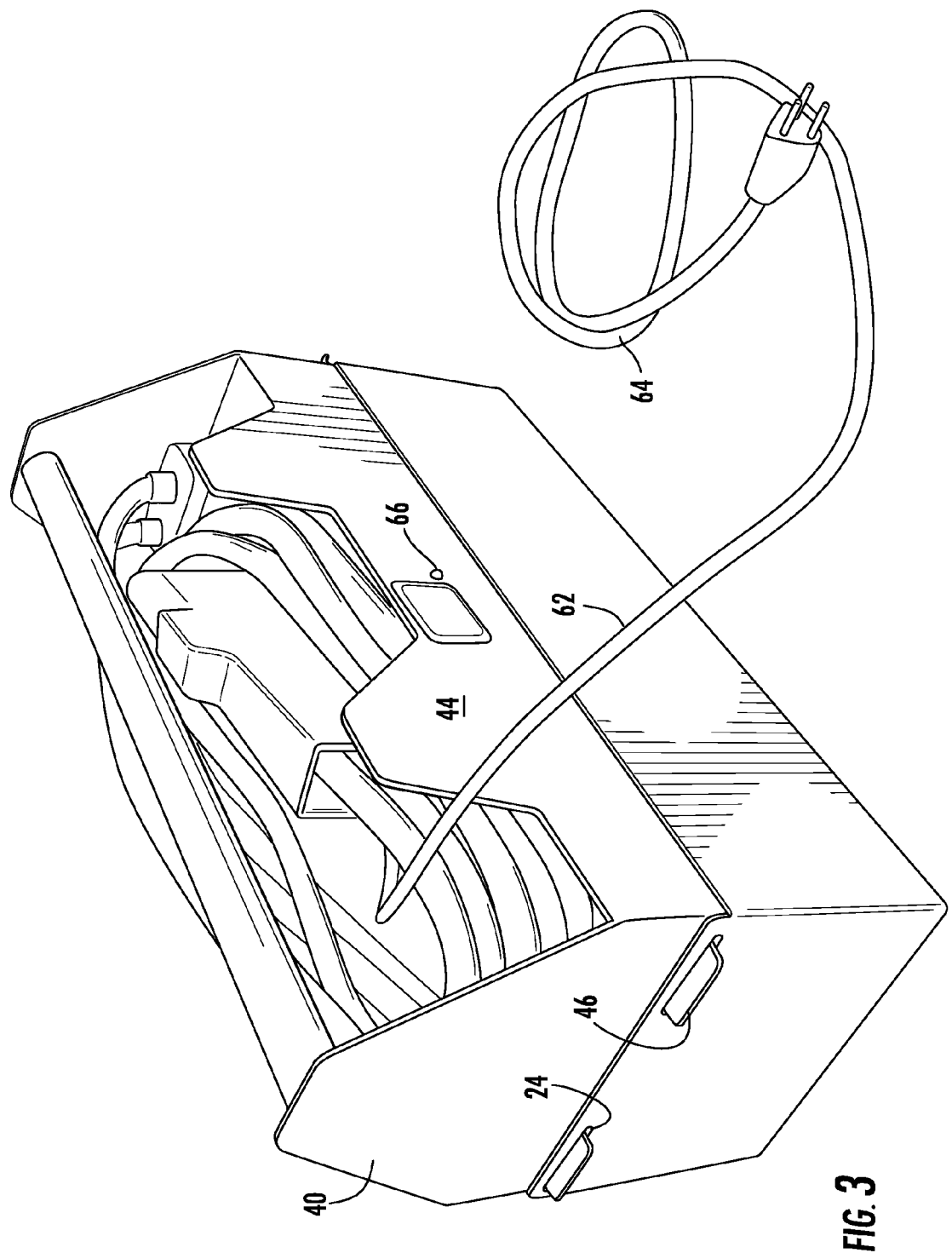
FIG. 3 is view in perspective of the starter battery and case assembly of FIG. 1, assembled and ready for use.

Turning now to FIGS. 1, 2, and 3, a starter battery and case assembly, generally designated 10, is illustrated. Assembly 10 includes a battery 12 and a lid 14. Battery 12 is generally sealed in a rectangularly shaped, battery wrap or box 16 formed of metal (e.g. aluminum. sheet metal, etc.), hard rugged plastic or the like. Battery box 16 is elongated with a bottom (not visible), opposed side, a front end 18 and a rear end 20. A generally hook-shaped flange 22 is formed along the upper edge of front end 18. Flange 22 is formed by rolling the upper edge of front end 18 out and downwardly to form a catch which is explained in more detail below.

Rear end 20 of battery box 16 extends upwardly above the upper surface of battery 12 sealed in battery box 16 and horizontally (and laterally to the box) extending slots 24 are formed just above the upper surface of battery 12. An electrical receptacle 30 is provided in the upper surface of battery 12 adjacent front end 18 and affords an electrical connection to battery 12.

Lid 14 includes a rectangular base or mounting structure 34 with a frame 36 affixed to extend around the periphery of base 34 and form a downwardly opening, receiving cavity designed to engage the upper edges of battery box 16 and completely encompass and enclose the upper surface of battery 12. Base 34 and frame 36 are constructed separately to make manufacturing easier but it will be understood that they could be formed as an integral unit, if desired. Further, base 34 and frame 36 are designed to prevent rain, snow, etc. from falling directly on battery 12 and to provide protection from external objects that might damage battery 12.

Frame 36 has a generally triangularly shaped front end 38 and rear end 40 which extend vertically above front end 18 and rear end 20, respectively, of battery box 16. The upper ends of front end 38 and rear end 40 are truncated to reduce the possibility of a user being injured. A tubular handle 42 is affixed between the front end 38 and rear end 40 by screws or the like to provide a convenient means for moving and carrying assembly 10 to and from a position of use (e.g. from a storage area to adjacent an aircraft or the like and return). Two generally upwardly extending, triangularly shaped retaining tabs 44 are provided along the upper edges of each of the opposed sides of frame 36 to retain equipment on the upper surface of base 34 (and within frame 36), as is explained below. The upper end of each of tabs 44 is truncated to reduce the possibility of injury to users.

A pair of horizontally outwardly extending tabs 46 are formed adjacent the lower edge of frame 36 along the rear end 40. Tabs 46 are formed and positioned to be engaged in slots 24 in rear end 20 of battery box 16 as a first step in the assembly of lid 14 onto battery box 16, as illustrated specifically in FIG. 2. A pair of over-center clamps 48 is affixed to the outer surface of front end 38 of frame 36 so as to engage hook-shaped flange 22 with tabs 46 engaged in slots 24. Over-center clamps 48 are the type that hook under flange 22 and a portion is cammed or moved over-center to pull and lock lid 14 tightly into engagement with battery box 16.

An electrical plug 55 is fixedly positioned in base 34 adjacent front end 38 of frame 36 so as to extend downwardly into electrical engagement with receptacle 30 when lid 14 is tightly engaged with battery box 16. Here it will be understood that receptacle 30 and plug 55 could be interchanged or reversed (i.e. a plug associated with battery 12 and a receptacle associated with lid 14. Therefore, receptacle 30 and plug 55 will be generically referred to herein, individually and together, as electrical connectors or as an electrical connector.

A pair of heavy duty connecting cables 57 is electrically attached to plug 55 at one end, one cable for each polarity, and an electrical plug or connection 60 is provided at the other end of cables 57 to attach to an electrical system of a vehicle such as aircraft, land vehicle, water vehicles, and the like, typically any vehicle with a 24 volt system. While an aircraft staring battery is described in this specific embodiment, it will be understood by those skilled in the art that it can be employed for any vehicle and other uses might be devised (possibly using a different electrical plug or connection). Also, a recharging cord 62 is electrically connected at one end to plug 55 and includes a 3-prong plug 64 at the other end for connecting battery 12 to a convenient source of recharging energy. As can be seen in the figures, cables 57, electrical plug 60, and recharging cord 62 are conveniently wound and stored on the surface of base 34 within the enclosure formed by front end 38, rear end 40 and tabs 44 of frame 36. Also, an inwardly extending, rain guard tab is affixed to the inner surface of front end 38 of frame 36 so as to generally over-lie plug 55 (without interfering with movement of connecting cables 57).

Also contained within base 34 (not visible) is electrical circuitry for connecting recharging cord 62 to battery 12 for recharging when 3-prong plug 64 is inserted into a source of power. Generally, the electrical circuitry includes a converter for changing AC to DC and reducing the voltage and current to an acceptable level. An indicator light 66, optionally included on one of the opposed sides of frame 36, provides an indication that battery 12 is recharging or is charged. The same or a different indicator light may optionally be included to indicate a proper connection to an aircraft or the like.

Thus, assembly 10 efficiently contains battery 12 and can be used to conveniently move battery 12 from a common storage area to a place of use (e.g. an aircraft or the like) by simply grasping handle 42 as one would a tool box or the like. At the site, electrical plug 60 and connecting cords 57 are removed from within frame 36 and used to conveniently attach battery 12 to the aircraft. After using assembly 10 to start a number of aircraft, battery 12 can be easily recharged by plugging 3-prong plug 64 into a convenient source of power (110 or 220 volts AC). When battery 12 becomes too old to properly recharge or to hold a proper charge, the old battery and battery box can simply be discarded and lid 14 can be easily attached to a new battery in a battery box.

Thus, all of the connecting and recharging cables are conveniently attached to greatly simplify the use and storage. Also, the assembly is constructed to releasably engage any one of a plurality of batteries. Each individual battery of the plurality of batteries is constructed substantially similar so that each battery is contained within a battery wrap or box and includes an electrical connector for electrically attaching the battery to the lid. Thus, whenever a battery becomes too old to operate properly it can simply be discarded, without having to discard any other equipment. This feature significantly reduces the over-all cost of the assembly (10) and greatly simplifies the use and operation.

Various changes and modifications to the embodiment herein chosen for purposes of illustration will readily occur to those skilled in the art. To the extent that such modifications and variations do not depart from the spirit of the invention, they are intended to be included within the scope of the invention thereof which is assessed only by a fair interpretation of the following claims.

Having fully described the invention in such clear and concise terms as to enable those skilled in the art to understand and practice the same, the invention claimed is:

Having fully described the invention in such clear and concise terms as to enable those skilled in the art to understand and practice the same, the invention claimed is:

1. A starter battery and case assembly comprising:
    a battery contained within a battery wrap, an electrical connector electrically attached to the battery and contained within the battery wrap;
    a lid constructed to releasably engage the battery wrap and to cover and protect the battery in an engaged position of operation and to be mechanically and electrically disengaged from the battery wrap in a disengaged position of operation, the lid including a handle for conveying the assembly, a mating electrical connector carried by the lid, the mating electrical connector positioned to electrically engage the electrical connector electrically attached to the battery with the lid engaged with the battery wrap and the electrical connector electrically disconnected from the battery with the lid disengaged from the battery wrap; and
    two opposite polarity cables each having one end connected to the battery through the mating electrical connector and a second end adapted to be connected to a remote electrical system.

2. A starter battery and case assembly as claimed in claim 1 wherein the battery is rechargeable and the assembly includes a recharge cord having one end electrically attached to the mating electrical connector carried by the lid and a second end adapted to be electrically attached to a source of power.

3. A starter battery and case assembly as claimed in claim 2 further including an electrical circuit carried by the lid, the electrical circuit coupling the recharge cord to the battery through the mating electrical connector carried by the lid and adapting a power source attached to the recharge cable to the battery.

4. A starter battery and case assembly as claimed in claim 1 wherein the battery wrap includes a battery box.

5. A starter battery and case assembly as claimed in claim 4 wherein the battery and battery box define an upper surface with upwardly extending outer edges and the lid is constructed to extend over and downwardly around the outer edges and to enclose the upper surface and the outer edges in the engaged position.

6. A starter battery and case assembly as claimed in claim 5 wherein the lid includes a rectangular base and a frame surrounding the base, the frame defining a downwardly directed receiving cavity designed to extend over and downwardly around the outer edges of the battery box, and the rectangular base and frame enclosing the upper surface and the outer edges of the battery box.

7. A starter battery and case assembly as claimed in claim 6 wherein the rectangular base and frame of the lid are formed as two separate components.

8. A starter battery and case assembly as claimed in claim 6 wherein the frame includes upwardly extending generally triangularly shaped opposed ends, and the handle includes a cylindrical element extending between and attached at opposite ends to the triangularly shaped opposed ends.

9. A starter battery and case assembly as claimed in claim 1 wherein the lid includes an upper surface designed to receive the two cables in a stored position in which the two cables are coiled and positioned on the upper surface of the lid.

10. A starter battery and case assembly as claimed in claim 1 wherein the lid includes controls and at least one indicator light connected to provide operator control of the assembly.

11. A starter battery and case assembly as claimed in claim 1 wherein the lid is constructed to releasably engage any one of a plurality of batteries, each individual battery of the plurality of batteries contained within a battery wrap and including an electrical connector electrically attached to the individual battery.

12. A starter battery and case assembly comprising:
a rechargeable battery contained within a battery box, an electrical connector electrically attached to the battery, the battery and battery box defining an upper surface with upwardly extending outer edges;
a lid constructed to releasably engage the battery box and further constructed to extend over and downwardly around the outer edges of the battery box and to enclose the upper surface and the outer edges in an engaged position of operation and to be mechanically and electrically disengaged from the battery box in a disengaged position of operation, the lid including a handle for conveying the assembly and a mating electrical connector carried by the lid, the mating electrical connector positioned to electrically engage the electrical connector electrically attached to the battery with the lid engaged with the battery box and the electrical connector electrically disconnected from the battery with the lid disengaged from the battery box;
two opposite polarity elongated cables each having one end connected to the battery through the mating electrical connector and a second end adapted to be connected to a remote electrical system; and
a recharge cord having one end electrically coupled to the battery through the mating electrical connector carried by the lid and a second end adapted to be electrically attached to a source of power.

13. A starter battery and case assembly as claimed in claim 12 wherein the lid includes an upper surface designed to receive the two cables in a stored position in which the two cables are coiled and positioned on the upper surface of the lid.

14. A starter battery and case assembly as claimed in claim 13 wherein the upper surface of the lid is further designed to receive the recharge cord in a stored position in which the recharge cord is coiled and positioned on the upper surface of the lid.

15. A starter battery and case assembly as claimed in claim 12 further including an electrical circuit carried by the lid, the electrical circuit coupling the recharge cord to the battery through the mating electrical connector carried by the lid and adapting a power source attached to the recharge cable to the battery.

16. A starter battery and case assembly as claimed in claim 12 wherein the lid includes controls and at least one indicator light connected to provide operator control of the assembly.

17. A starter battery and case assembly as claimed in claim 12 wherein the lid is constructed to releasably engage any one of a plurality of batteries, each individual battery of the plurality of batteries contained within a battery wrap and including an electrical connector electrically attached to the individual battery.

18. A starter battery and case assembly comprising:
a rechargeable battery contained within a battery box, an electrical connector electrically attached to the battery, the battery and battery box defining an upper surface with upwardly extending outer edges;
a lid constructed to releasably engage the battery box, the lid including a rectangular base and a frame surrounding the base, the frame and base defining an upper surface and a downwardly directed receiving cavity constructed to extend over and downwardly around the outer edges of the battery box and enclose the upper surface and the outer edges of the battery box in an engaged position of operation and to be mechanically and electrically disengaged from the battery box in a disengaged position of operation, the lid including a handle for conveying the assembly, and a mating electrical connector carried by the lid, the mating electrical connector positioned to electrically engage the electrical connector electrically attached to the battery with the lid engaged with the battery box and the mating electrical connector electrically disconnected from the battery with the lid disengaged from the battery box;
two opposite polarity elongated cables each having one end connected to the battery through the mating electrical connector and a second end adapted to be connected to a remote electrical system, the upper surface of the lid designed to receive the two cables in a stored position in which the two cables are coiled and positioned on the upper surface of the lid; and
a recharge cord having one end electrically coupled to the battery through the mating electrical connector carried by the lid and a second end adapted to be electrically attached to a source of power, the lid is further designed to receive the recharge cord in a stored position in which the recharge cord is coiled and positioned on the upper surface of the lid.

19. A starter battery and case assembly as claimed in claim 18 wherein the assembly includes an electrical circuit carried by the lid, the electrical circuit coupling the recharge cord to the battery through the mating electrical connector carried by the lid and adapting a power source attached to the recharge cable to the battery.

20. A starter battery and case assembly as claimed in claim 18 wherein the lid is constructed to releasably engage any one of a plurality of batteries, each individual battery of the plurality of batteries contained within a battery wrap and including an electrical connector electrically attached to the individual battery.

21. A starter battery and case assembly as claimed in claim 18 wherein the frame includes upwardly extending generally triangularly shaped opposed ends, and the handle includes a cylindrical element extending between and attached at opposite ends to the triangularly shaped opposed ends.

* * * * *